United States Patent
Thies

(10) Patent No.: US 11,241,907 B2
(45) Date of Patent: Feb. 8, 2022

(54) ERASER

(71) Applicant: STAEDTLER MARS GMBH & CO. KG, Nuremberg (DE)

(72) Inventor: Andreas Thies, Effeltrich (DE)

(73) Assignee: STAEDTLER MARS GMBH & CO. KG, Nuremberg (DE)

(*) Notice: Subject to any disclaimer, the term of this patent is extended or adjusted under 35 U.S.C. 154(b) by 326 days.

(21) Appl. No.: 16/315,303

(22) PCT Filed: Jul. 5, 2017

(86) PCT No.: PCT/EP2017/000795
§ 371 (c)(1),
(2) Date: Jan. 4, 2019

(87) PCT Pub. No.: WO2018/010835
PCT Pub. Date: Jan. 18, 2018

(65) Prior Publication Data
US 2020/0180351 A1 Jun. 11, 2020

(30) Foreign Application Priority Data

Jul. 12, 2016 (DE) .................. 10 2016 008 559.2

(51) Int. Cl.
*B43L 19/00* (2006.01)
*C09D 9/02* (2006.01)

(52) U.S. Cl.
CPC ............ *B43L 19/0025* (2013.01); *C09D 9/02* (2013.01)

(58) Field of Classification Search
CPC .............................. B43L 19/00; B43L 19/0025
See application file for complete search history.

(56) References Cited

U.S. PATENT DOCUMENTS

| 4,350,787 | A | * | 9/1982 | Kimpel | ............... B43L 19/0025 524/302 |
| 5,521,239 | A | * | 5/1996 | Handl | ................. B43L 19/0025 524/158 |
| 9,546,259 | B2 | | 1/2017 | Colle et al. | |
| 9,840,454 | B2 | | 12/2017 | Kubitschke et al. | |
| 2011/0124778 | A1 | | 5/2011 | Morimoto et al. | |

FOREIGN PATENT DOCUMENTS

| CN | 104419104 A | | 3/2015 |
| DE | 2636885 B2 | | 2/1978 |
| DE | 3131457 C2 | | 2/1983 |
| DE | 202013100170 U1 | | 4/2014 |
| DE | 102013018456 A1 | | 5/2015 |
| GB | 2505341 A | | 2/2014 |
| JP | 2007169350 A | | 7/2007 |
| JP | 2011110894 A | | 6/2011 |
| JP | 2011-251432 A | * | 12/2011 |
| KR | 10-2011-0081921 | * | 7/2011 |
| WO | 2009118261 A1 | | 10/2009 |

OTHER PUBLICATIONS

Derwent Acc-No. 2011-L07331 Derwent Week 201253; Inventor: Choong K K et al.; Patent Family: Pub-No. KR 2011081921 A, Jul. 15, 2011, (2011).*

* cited by examiner

*Primary Examiner* — Randall E Chin
(74) *Attorney, Agent, or Firm* — Lucas & Mercanti, LLP; Klaus P. Stoffel

(57) ABSTRACT

An eraser for removing strokes of writing, painting and/or drawing implements, including at least one binder and at least one plasticizer, wherein the at least one plasticizer is a polyol ester.

7 Claims, No Drawings

ERASER

CROSS-REFERENCE TO RELATED APPLICATIONS

The present application is a 371 of International application PCT/EP2017/000795, filed Jul. 5, 2017, which claims priority of DE 10 2016 008 559.2, filed Jul. 12, 2016, of these applications is hereby claimed and these applications are incorporated herein by reference.

BACKGROUND OF THE INVENTION

The invention relates to an eraser.

Erasers for removing marks by writing, painting and/or drawing implements are known in principle in the prior art.

Soft PVC systems for erasers have been known since the 1960s. As a rule, they consist of polyvinyl chloride (PVC) as the base polymer/binder, which is extended with filler and a plasticizer in order to plasticize the binder. Furthermore, other components such as colorants, or functional additives such as solvents may be added in order to obtain special erasing properties. In erasers of this type, the plasticizer component has been changed again and again because of physiological requirements. PVC erasers of this type are usually produced by preparing a paste from the components and subsequent gelling and shaping in an extruder along with the application of heat.

The disadvantage in this regard is that erasers of this type are expensive to produce, because the high cost of the raw material of the plasticizer component makes it a significant component of the cost of the product.

In general, it can be stipulated that plasticizers that are used must be those which are classified as being physiologically harmless.

Furthermore, various plasticizers used elsewhere to date do not satisfy the technical requirements of exhibiting good extrudability, of having good properties regarding ease of preparation of a paste, of having satisfactory erasing properties and of having the required softness.

In addition, it has been shown that many plasticizers that have been used until now in erasers have a strong tendency to migrate.

Thus, known prior art document DE 31 31 457 C2 describes erasers with PVC as the binder and a variety of plasticizers.

The disadvantage with this is that some of the plasticizers used are phthalates, which are classified as being hazardous to health.

Paraffin oils, cited as an alternative plasticizer, give rise to significant disadvantages as regards erasability. Upon erasing, the marks become smeared.

SUMMARY OF THE INVENTION

The objective of the invention is thus to provide an eraser which can be produced cheaply, which has low migration of the plasticizer components and, in addition, which exhibits good erasability.

This objective of providing an eraser for removing marks by writing, painting and/or drawing implements, which at least consists of at least one binder and at least one plasticizer, is achieved with the features of the present invention.

Surprisingly, it has been shown that the objective is achieved by using polyol ester as the plasticizer component.

By using polyol ester as the plasticizer in binder or binder mixtures, the paste can not only be produced in the usual manner, but also the subsequent extrusion can be carried out.

Moreover, it has surprisingly been shown that the erasing properties and the results of erasing achieved thereby are comparable with those of more expensive plastidzers.

The term "erasability" or "erasing capability" as used in the context of the invention means the substantial removal of pencil marks on media, wherein the residual colouration of the medium is a measure of the erasing performance.

Furthermore, the major advantage when using polyol ester lies in the fact that the migration is less than with plasticizers of the prior art such as acetyltributyl citrate (ATBC), for example.

In addition, the hardness of the eraser can readily be adapted or adjusted by varying the piasticizer content.

A further major advantage lies in the fact that by using polyol ester as the piasticizer, the eraser is very cheap to produce.

The composition of the eraser in accordance with the invention will now be described in more detail in the following general examples.

General Example 1

| | |
|---|---|
| Binder | 20-60% by weight |
| Polyol ester as plasticizer | 20-60% by weight |
| Fillers | 0-60% by weight |
| Additives | 0-10% by weight |

General Example 2—Preferred Embodiment

| | |
|---|---|
| Binder | 30-55% by weight |
| Polyol ester as plasticizer | 30-55% by weight |
| Filler | 0-50% by weight |
| Additives | 0-8% by weight |

The eraser in accordance with the invention comprises, as the at least one binder, polyvinyl chloride (PVC), polyamide (PA), polyurethane (PU), polyolefins (PO), rubber, polyvinyl acetate (PVAc), polymers from the methacrylate group (MA), or mixtures of these binders, which are known as polymer blends.

Examples of MA are polyalkyl methacrylate (PAMA), polymethyl methacrylate (PMMA), polybutyl methacrylate (PBMA), polyethyl methacrylate (PEMA) and polypropylene methacrylate (PPMA).

Surprisingly, it has been shown that the stated objective can be achieved with the binders described above, alone or as mixtures of the binders, in combination with polyol ester.

The preferred binder which is used is PVC because the best results for achieving the stated objective can be obtained with this binder, in particular the erasability and migration. In addition, PVC is one of the cheapest polymers obtainable on the market.

Possible fillers which may be used are chalk (calcium carbonate), mineral compounds such as pumice powder, kaolin, glass powder, clay and/or talc.

In addition, or as an alternative, the eraser may comprise organic fillers as the filler. Examples in this regard are wood flour, meal and/or products derived therefrom.

Other supplements or additives may be colorants, waxes, oils, stabilizers, emulsifiers, solvents and/or abrasive aggregates.

The colorants may be dyes and/or pigments.

The invention will now be illustrated in more detail by means of the following formulation examples.

Formulation Example 1

| PVC | 33.3% by weight |
| Polyol ester | 33.3% by weight |
| Kaolin | 33.3% by weight |

Formulation Example 2

| PVC | 30.0% by weight |
| Polyol ester | 33.0% by weight |
| Titanium dioxide as colorant | 1.0% by weight |
| Chalk as filler | remainder |

Formulation Example 3

| PMMA | 28.0% by weight |
| Polyol ester | 39.0% by weight |
| Calcium carbonate as filler | remainder |

Formulation Example 4

| PVC | 30.0% by weight |
| Polyurethane (PU) | 10.0% by weight |
| Polyol ester | 30.0% by weight |
| Titanium dioxide as colorant | 1.0% by weight |
| Chalk as filler | remainder |

An eraser of this type may be produced in the following manner, for example.

Example of Production

The PVC powder, the plasticizer and any additives used were blended into a homogeneous plastisol in a dissolver.

The plastisol obtained in this manner was gelled using a twin-screw extruder and shaped into a continuous rod through a die.

Following a cold bath, the eraser rod was cut to the desired length and printed and packaged if necessary.

The invention claimed is:

1. An eraser for removing marks by writing, painting and/or drawing implements, comprising: at least one binder, wherein the binder is at least one of the group consisting of: polyamide (PA), polyurethane (PU), polyolefins (PO), rubber, polyvinyl acetate (PVAc), and mixtures thereof; and, at least one plasticizer, wherein the at least one plasticizer is formed by a polyol ester.

2. The eraser according to claim 1, wherein the eraser comprises polyol ester in a quantity of 20% to 60% by weight.

3. The eraser according to claim 1, further comprising chalk (calcium carbonate), mineral compounds and/or organic fillers as fillers.

4. The eraser according to claim 3, wherein the mineral compounds are at least one of the group consisting of: pumice powder, kaolin, glass powder, clay and talc.

5. The eraser according to claim 3, wherein the organic filers are wood flour, meal and/or products derived therefrom.

6. An eraser for removing marks by writing, painting and/or drawing implements, comprising:

| PVC as binder | 20-60% by weight |
| Polyol ester as plasticizer | 20-60% by weight |
| Organic Fillers | 0-60% by weight |
| Other additives | 0-10% by weight, | wherein the organic fillers are wood flour and/or products derived therefrom.

7. The eraser according to claim 6, wherein the eraser comprises colorants, waxes, oils, emulsifiers, stabilizers, solvents and/or abrasive aggregates as the other additives.

* * * * *